United States Patent Office 3,564,900
Patented Feb. 23, 1971

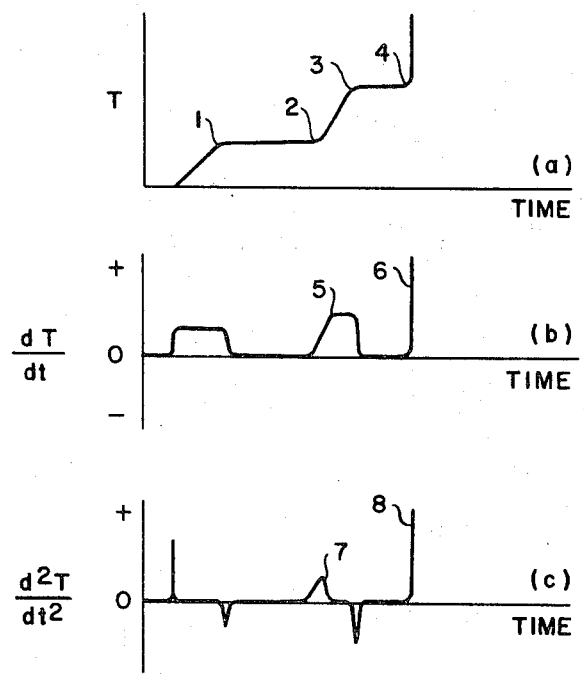
FIG. 1
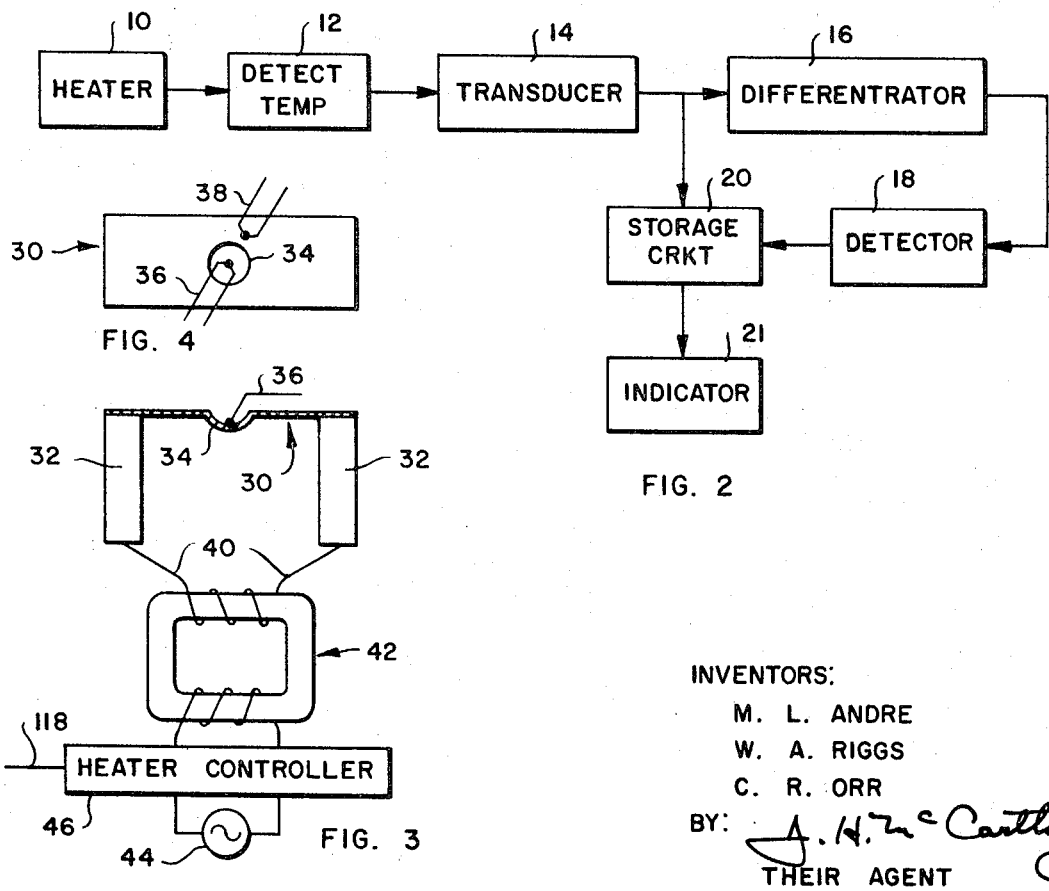

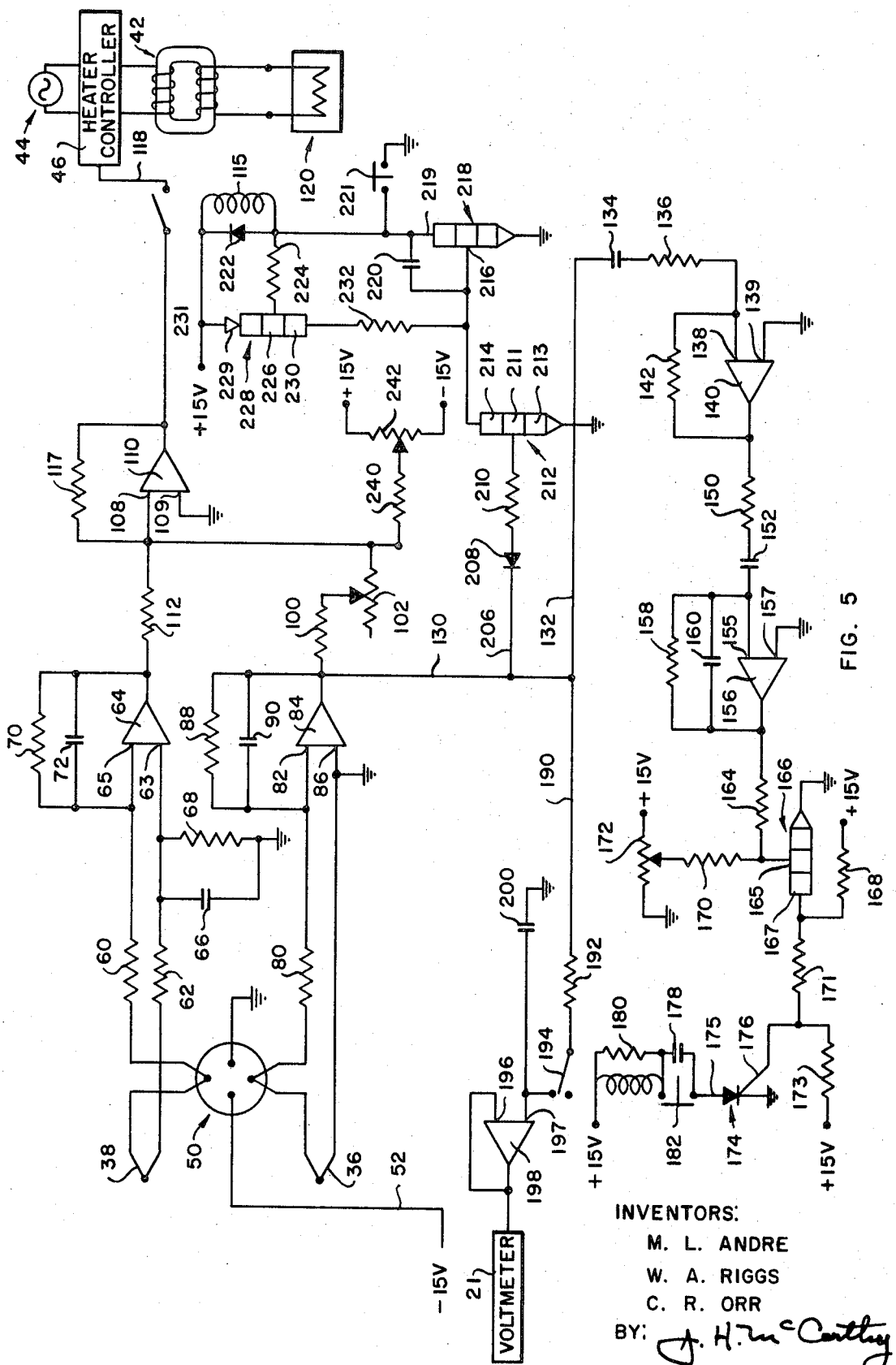

3,564,900
END-POINT ANALYZER
Marshall L. André, Houston, William A. Riggs, Pasadena, and Charles R. Orr, Houston, Tex., assignors to Shell Oil Company, New York, N.Y., a corporation of Delaware
Filed Apr. 10, 1968, Ser. No. 720,155
Int. Cl. G01n 25/08
U.S. Cl. 73—17          6 Claims

ABSTRACT OF THE DISCLOSURE

A method and apparatus for quickly determining the end-point of a distillation process by rapidly heating a very small sample of the liquid to be distilled, measuring the sample temperature with thermocouples, finding the second derivative of the thermocouple outputs, and detecting a predetermined voltage level in the second-derivative signal.

BACKGROUND OF THE INVENTION

This invention is directed at improving the method and apparatus for measuring the end-point of a liquid distillation so that the amount of time taken to measure the end-point is reduced by an order of magnitude and the reproducibility of measurments is also increased.

In the past, end-points were determined by placing a 100-milliliter sample in a flask and recording the volume of liquid distilled as a function of temperature. The technique required from 20 to 30 minutes and was reproducible only within limits of ±10° C.

As research and production techniques in special chemicals have become more refined, the need for a more sophisticated method of determining end-point has grown. In particular, it would be useful to have an instrument that could be used in a refinery as a spot check on quality control. To practically perform this function, however, an instrument capable of making readings in a very few minutes would be needed. It is therefore an object of this invention to provide a method and an apparatus for making end-point measurements that take an order of magnitude less time than the prior art methods.

It is also an object of this invention to provide a method and apparatus for making end-point measurements in refineries.

Finally it is an object of this invention to provide a method and apparatus for more accurately measuring end-points.

SUMMARY OF THE INVENTION

The broad concept of this invention can be carried out by evaporating a very small sample of the liquid to be tested, detecting the temperature and converting it to a signal, operating on the electrical signal to form the second derivative thereof, determining the time at which the second derivative signal reaches a predetermined level, and recording the temperature of the liquid at that time. An apparatus found useful for carrying forward this method may consist of a simple container, which may be a thin conducting foil having a portion thereof shaped to hold a small sample of liquid. A temperature measuring means is connected to the sample container and adapted to generate a first electrical signal proportional to the temperature of the sample. A heater means is connected to the container to supply thermal energy thereto. A circuit means is connected to the temperature measuring means and adapted to generate a second electrical signal proportional to a time derivative of the first electrical signal. A voltage level detection means is connected to the circuit means and adapted to generate a third electrical signal in response to the second electrical signal reaching a predetermined voltage level. And a storage means is connected to the temperature measuring means and the voltage detection means. The storage means is adapted to store the voltage level of the first signal at the point in time that the storage means receives the third electrical signal.

BRIEF DESCRIPTION OF THE DRAWING

FIG. 1 shows a sample temperature versus time graph and the first and second derivative thereof with respect to time.

FIG. 2 is a block diagram of a generalized system for implementing the method of the subject invention.

FIG. 3 is a schematic of a particular embodiment of a sample holder, heater assembly.

FIG. 4 is a top view of the sample holder of FIG. 3.

FIG. 5 is a detailed schematic of an apparatus for carrying out the method of the subject invention.

The invention can be best understood by referring to the wave forms of FIG. 1. FIG. 1(a) is a plot of the sample temperature versus time. FIG. 1(b) is the first derivative of the curve of FIG. 1(a) with respect to time, and FIG. 1(c) is a second derivative of FIG. 1(a) with respect to time.

The sample liquid depicted in FIG. 1 is generalized to include two components with a different temperature of vaporization. Referring now to FIG. 1(a), it will be noted that the sample liquid temperature rises until it reaches a temperature 1 wherein the energy absorbed by the vaporization of the lowest boiling component balances the input of thermal energy. The temperature then remains constant until the lowest boiling component is completely volatilized, at point 2. At this time, the temperature again rise to 3 the boiling point of the remaining constituent at which point the energy of vaporization again balances the thermal energy input. The temperature will then remain constant until some point 4 when all of the liquid is evaporated. At this point, the temperature will rise sharply.

The logic involved in using the second derivative as an indicator of end point is as follows:

Before the sample starts to vaporize, the rate of rise in temperature of the sample cup is limited by the mass and heat capacity or "thermal mass" of the cup and its contents. As the various components evaporatte from the sample, the rate of rise (1st derivative) of the sample temperature will change as illustrated at points 5 and 6 in FIG. 1(b). The *change* in rate of rise (2nd derivative) will not be large until the last trace of sample has evaporated. At the time that the last bit of sample disappears, the sample cup has the lowest mass and its temperature can rise at a very high rate. The last bit of sample vanishes very rapidly and produces a very sharp break or inflection point in the time/temperature curve. The 2nd derivative signal is, therefore, *largest* at this point, as indicated by reference numeral 8 in FIG. 1(c).

DESCRIPTION OF THE PREFERRED EMBODIMENT

Reference is made to FIG. 2 which shows in simplified block form the functional elements necessary to carry out the subject invention. A heater 10 is necessary to supply thermal energy to a sample liquid for testing. Next the temperature of the liquid is detected with a temperature detector 12. The temperature is then converted or transduced to a parameter such as a voltage or hydraulic pressure by transducer 14 for more convenient manipulation. The output of transducer 14 is differentiated one or more times by differentiator 16, and a predetermined amplitude level of the output of differentiator 16 is detected in detector 18. The presence of an output signal from detector 18 indicates the end-point of the process under consideration at which point the sample temperature is sored by sorage circuit 20 for readout by indicator 21.

As heat is applied to the sample container, the sample vaporizes. Because a charge of state between liquid and vapor requires a net input of heat, the temperature of the sample container is constrained to a value near the boiling point of the liquid being vaporized. When the liquid or the higest boiling component therein has evaporated, the temperature of the container will rise sharply. On a time/temperature coordinate system, this point is indicated by a sharp break or inflection in the time/temperature curve. It has been found that the inflection point may be easily detected from a signal corresponding to the second derivative of the temperature signal.

For a detailed description of an apparatus for carrying out the subject invention, reference is made to FIGS. 3 and 4.

In FIG. 3, a stainless steel sample container 30 is bonded on either end to brass posts 32 and is provided with an indentation 34. A first thermocouple 36 is positioned in the bottom of indentation or well 34 to detect the temperature of a liquid sample therein. A second thermocouple 38 is positioned on the sample container at some distance from the liquid to detect the temperature of the sample container uninfluenced by the liquid evaporation. By way of example, convenient dimensions for the sample container are 2" x 1" x .001" with the indentation .12" deep and .37" in diameter. With this container configuration, the quatity of sample liquid used to determine an end-point is very small, of the order of 0.1 milliliter, and therefore evaporates very quickly. But at the same time, accurate control of the evaporation rate and accurate monitoring of the sample temperature are achieved.

Electrical leads 40 from the secondary of a transformer 42 are connected to brass posts 32 so that an electrical current flows through an external circuit consisting of brass posts 32 and sample container 30. The primary side of transformer 42 is connected to an alternating current power source 44 connected in series with a heater control means 46. The heater control means is a known device containing silicon controlled rectifiers which conects between an AC power source and a load such as, for example, a heater. Power to the load may be adjusted smoothly by a DC control voltage applied to a control terminal. Complete removal of DC control voltage will turn the heater off completely. In this embodiment, thermocouples 36 and 38 perform both the function of temperature sensing and transducing.

Further details of the electrical circuitry associated with the embodiment shown in FIG. 3 are shown in FIG. 5. A cold junction compensator 50 is provided for calibration of the thermocouples. Power for the operation of the cold junction compensator is provided by a 15 volt power supply via lead 52.

The output of thermocouple 38 is supplied through resistors 60 and 62 to inputs 63 and 65 of amplifier 64. Capacitor 66 and resistor 68 are connected in parallel between ground and the node between resistor 62 and amplifier 64 and operate to filter high frequency noise from the circuit. The output of amplifier 64 is fed back through the parallel combination of resistor 70 and capacitor 72 to input 65 of amplifier 64. Resistors 60 and 70 combine to determine the gain of amplifier 64 while capacitor 72 operates to integrate out high frequency noise.

A temperature proportional signal is taken from thermocouple 36 via resostor 80 to input 82 of amplifier 84 while input 86 of amplifier 84 is grounded. The output of amplifier 84 is fed back via the parallel combination of resistor 88 and capacitor 90 to input terminal 82. Resistors 80 and 88 in combination determine the gain of amplifier 84 while capacitor 90 reduces high frequency noise.

The output of amplifier 84 is connected via resistor 100 and potentiometer 102 to input 108 of amplifier 110 while input 109 of amplifier 110 is grounded. The output of amplifier 64 is also connected via resistor 112 to input 108. The output of amplifier 110 is fed back through resistor 117 to input 108. Resistor 117 in conjunction with resistor 112 determine the gain of amplifier 110.

The output of amplifier 110 is supplied via relay 115 to control terminal 118 of controller 46. Heater elements 120 of FIG. 5 consist of sample holder 30 and brass post 32 in FIG. 3.

The output of amplifier 84, an amplifier signal proportional to the temperature of the sample, is supplied via leads 130 and 132 to a differentiating network. Capacitor 134 and resistor 136 are serially connected to input 138 of amplifier 140 while the input 139 of amplifier 140 is grounded. The output of amplifier 140 is fed back to input 138 via resistor 142. The serial combination of capacitor 134 and resistor 136 combined with resistor 142 determine the gain and functional characteristics of amplifier 140. Effectively the input signal supplied via leads 130 and 132 is differentiated.

The output of amplifier 140 is connected via resistor 150 and capacitor 152 to input 155 of amplifier 156 whose input 157 is grounded. The output of amplifier 156 is fed back through the parallel combination of resistor 158 and capacitor 160 to input 155. The serial combination of resistor 150 and capacitor 152 taken in conjunction with the parallel combination of resistor 158 and capacitor 160 determines the gain and functional characteristics of amplifier 156. Effectively the output signal of amplifier 140 is differentiated; thus, the output signal of amplifier 156 is proportional to the second derivative of the output of amplifier 84, which in turn is proportional to the sample temperature.

The output of amplifier 156 is connected via resistor 164 to the base of NPN transistor 166. The emitter of transistor 166 is grounded and the collector 167 is connected via resistor 168 to a positive power supply of 15 volts. Base 165 is also connected via resistor 170 and potentiometer 172 to a power supply of ±15 volts. Collector 167 is connected via resistor 171 to control terminal 176 of silicon-controlled rectifier 174. The cathode of silicon-controlled rectifier 174 is grounded while anode 175 is connected via capacitor 178 to relay 180. A reset switch 182 is provided to reset relay 180. Control terminal 176 is biased positively by a ±15 volt power supply connected through resistor 173.

The output of amplifier 84 representing sample temperature is also supplied via leads 130 and 190 to a storage device. The output of amplifier 84 is connected via resistor 192 through a switch portion 194 of relay 180 to input 197 of amplifier 198. Input 197 is also coupled to ground through capacitor 200. The output of amplifier 198 is fed back 100% to input 196, and is connected to a voltmeter or other indicator 21 for reading the temperature of the sample at the end-point.

There is also provided circuitry for preventing damage to the appaartus by excessive heat. To this end, the output of amplifier 84 is connected via leads 130 and 206 to the cathode end of Zener diode 208. The anode of diode 208 is connected via resistor 210 to base 211 of NPN transistor 212. Transistor 212 is provided with an emitter 213 connected to ground and a collector 214 connected to the base 216 of transistor 218. The collectors of transistors 212 and 218 are interconnected via capacitor 220. Collector 219 of transistor 218 is connected to one terminal of relay 115 while the other terminal of the relay is connected to a positive power supply of 15 volts. Connected across relay 115 is a diode 222 whose cathode is common with the 15 volts power supply.

Collector 219 of transistor 218 is connected via resistor 224 to base 226 of a PNP transistor 228. The emitter 229 of transistor 228 is connected to the common node of relay 115, the cathode of diode 222, and the power supply. The collector 230 of transistor 228 is connected via resistor 232 to the node common between base 216 of transistor 218, capacitor 220, and collector 214 of transistor 212.

A start switch 221 is connected between collector 219 and ground.

A bias is provided for input 108 of amplifier 110 by connecting input 108 via resistor 240 to potentiometer 242. One nontap end of potentiometer 242 is connected to a positive 15 volt power supply while the other nontap end of potentiometer 242 is connected to a negative 15 volt power supply.

OPERATION OF THE INVENTION

A few drops of a sample liquid are placed in sample container 34. Operation of the electrical circuitry is initiated by depressing start button 221 and reset button 182. Assume that transistors 218 and 228 are in a nonconducting state. The depression of start button 221 has the effect of grounding collector 219 and transistor 218 momentarily. This action starts a regeneration of transistors 218 and 228 into a conducting state. The initial grounding of collector 219 also causes a surge of current from power supply 231 through the coil of relay 115. The voltage drop through the coil effectively lowers the base of transistor 228 to a potential less than the potential of emitter 229 thereby causing transistor 228 to begin conducting. As transistor 228 begins to conduct, the voltage level of its collector 230 will begin to rise. This in turn raises the voltage level of base 216 of transistor 218 resulting in transistor 218 also beginning to conduct since the voltage drop across resistor 232 is sufficient to forward bias the collector-base junction of transistor 218. The regeneration process continues until the conduction through transistors 218 and 228 are limited by saturation. In this state, current flows through the coil of relay 115 causing the output of amplifier 110 to be electrically connected to controller 46. When relay 115 is closed, controller 46 supplies electrical energy through transformer 42 to heater 120. The rate of heat supplied to heater 120 is determined by the signal level on control electrode 118 of controller 46. This signal, being the output of amplifier 110, is initially determined by a bias setting on amplifier 110's input 108. A setting of potentiometer 242 effectively performs this function.

Reset button 182 is a normally closed switch. Its purpose is to interrupt any current flowing in silicon-controlled rectifier 174 and thereby cause it to become nonconducting. Once in a nonconducting state, silicon-controlled rectifier 174 will remain nonconducting until turned on again by transistor 166. Depressing reset button 182, then, removes the current through relay coil 180 and permits contacts 194 to close. When contacts 194 are closed, the temperature signal from amplifier 84 is applied to capacitor 200 and amplifier 198. The signal output of amplifier 198, therefore, follows the sample temperature signal until contacts 194 are again opened, at which time the temperature signal is stored by capacitor 200. Since the initial turn-on of the sample heater by start button 221 causes a large spike of voltage at the output of amplifier 156, depression of reset button 182 must be delayed until a few seconds after depression of start button 221.

The polarity of the heater temperature signal, that is, the output of amplifier 64, is such that an increase in heater temperature tends to reduce power to the heater, i.e., is negatively proportional, whereas the polarity of the sample temperature signal, that is, the output of amplifier 84, tends to increase the power to the heater. The presence of a sample in the cup with the attendant heat loss due to evaporation causes the sample temperature to lag that of the heater. This causes the heater temperature to predominate and thus retard the rise in temperature of the systems so long as evaporation is occurring. As the sample liquid disappears, the sample temperature signal predominates and, combined with the lack of sample liquid to absorb energy, causes a very rapid temperature rise. This arrangement insures a constant rate of heat input and also has the important advantage of emphasizing the end-point.

The sample temperature is also supplied through leads 130, 190, and conducting arm 194 of relay 180 to capacitor 200. Capacitor 200 serves as a storage element to store any temperature signal value present on lead 190 at the moment relay contacts 194 become nonconducting. Amplifier 198 is connected as shown with its output connected to input 196. The output of amplifier 198 will therefore follow exactly any signal voltage present across capacitor 200. The sample temperature signal is also supplied via leads 130 and 132 to differentiating circuits consisting of amplifiers 140 and 156 and their associated passive components. The output of amplifier 156 is a signal proportional to the second derivative of the sample temperature signal. The output of amplifier 156 will remain essentially constant with respect to time except when the sample temperature signal goes through an inflection point. This point will appear as a spike of voltage at the output of amplifier 156.

The circuitry following amplifier 156 is designed to detect the spike output thereof, and operates in the following manner. Transistor 166 is normally in a conducting state, resulting in collector 167 being only slightly above ground potential. Base 165 receives its input from potentiometer 172. The polarity is such that the bias voltage from potentiometer 172 and the output signal of amplifier 156 subtract at the node between resistor 170 and resistor 164. When the bias voltage and signal voltage are equal, the input to base 165 will be zero and transistor 166 will switch into a nonconducting node. The collector potential will then swing to 15 volts and thereby provides a positive signal to control electrode 176 of silicon-controlled rectifier 174 and causes a current to pass through the coil of relay 180 which in turn switches the relay and opens the signal path between amplifiers 84 and 198. Amplifier 198 thereby stores the voltage level of the sample temperature signal at the moment relay 180 is switched. Since relay 180 is switched when energized by a signal trigger as the temperature signal went through an inflection point, the end point of the sample is effectively recorded. Once silicon-controlled rectifier 174 is caused to conduct it will remain in conduction until reset button 182 is again depressed. By means of potentiometer 172, the positive voltage applied to resistor 170 is adjusted so that conduction in transistor 166 will continue until the largest output from amplifier 156 occurs at the time the sample cup becomes dry. Potentiometer 172 is adjusted to cause the circuit to ignore lesser outputs from amplifier 156.

The apparatus of FIG. 4 is protected from overheating in the following way. As the voltage output from amplifier 84 increases, Zener diode 208 is increasingly subjected to a reversed bias voltage. As is well known in the art, a point will be reached where a Zener diode can withstand no more reverse voltage without passing a substantial current. At this point, curent will flow through resistor 210 to base 211 of transistor 212 thereby causing transistor 212 to switch into a conducting mode. The conduction of transistor 212 effectively reduces the potential of base 216 of transistor 218 to a point where transistor 218 is in a nonconducting state. With transistor 218 in a nonconducting state, relay 115 is deenergized, and the power supply is disconnected from the heater.

A bell jar may be placed over the sample container to reduce effects of air currents, and indeed the invention contemplates a partial evacuation of the environment surrounding the sample chamber to allow evaporation of some liquids that would thermally crack under normal atmospheric pressure.

We claim as our invention:

1. An apparatus for quickly detecting the end-point of a liquid from a small sample thereof, comprising:
   a sample container for holding the sample liquid;
   temperature measuring means for generating a first electrical signal proportional to the temperature of said sample liquid, said means operatively engaging said sample liquid;
   means for heating said sample liquid operatively connected thereto;
   circuit means for generating a second electrical signal proportional to the second derivative of said first electrical signal, said circuit means operatively connected to said temperature measuring means;
   detection means for generating a third signal in response to said second signal reaching a predetermined voltage level, said detection means being operatively connected to said circuit means; and
   storage means for storing the voltage level of said first electrical signal when actuated by said third electrical signal, said storage means being operatively connected to said temperature measuring means and said detection means.

2. The apparatus of claim 1 further characterized by:
   a temperature indicator connected to said storage means to display said stored voltage level as sample end-point.

3. The apparatus of claim 1 further characterized by:
   means for de-energizing said heater means when the temperature of said sample container reaches a predetermined value, said de-energizing means being connected between said heater means and said temperature measuring means.

4. The apparatus of claim 1 further characterized by:
   means for controlling said heater such that said sample container receives a constant rate of heat input while said sample remains in said sample container and a higher rate of heat when said sample has evaporated, said heater control means being operatively connected between said sample container and said heater.

5. The apparatus of claim 4 wherein said heater control means comprises:
   a first thermocouple disposed in said sample container and adapted to measure the temperature of a sample therein and generate a first electrical signal proportional thereto;
   a second thermocouple disposed on said heater means and adapted to measure the temperature of said heater means and generate a fourth electrical signal negatively proportional thereto;
   summing means connected to said first and second thermocouple for producing an output signal proportional to the algebraic sum of said first and said fourth electrical signals;
   a source of electrical power; and
   an electronic power control means for regulating the flow of power therethrough in a manner proportional to an electronic signal supplied to a control terminal thereof, said control means having a power input connected to said source of electrical power, a power output connected to said heater means, and a control terminal connected to said summing means.

6. In a method of measuring an end-point of a liquid, the steps of:
   selecting a small sample of said liquid;
   supplying heat to said small sample of liquid;
   detecting the temperature of said small sample of liquid;
   generating a first electrical signal proportional to said temperature;
   differentiating said first electrical signal to form a second electrical signal proportional to the first derivative of said first signal;
   differentiating said second electrical signal to form a third electrical signal proportional to the second derivative of said temperature signal;
   automatically detecting the time at which said third electrical signal reaches a predetermined amplitude; and
   indicating the temperature of said small liquid sample at said time.

References Cited
UNITED STATES PATENTS

| | | | |
|---|---|---|---|
| 1,307,601 | 6/1919 | Saunders | 73—17X |
| 2,594,683 | 4/1952 | Rolfson | 73—17 |
| 2,755,999 | 7/1956 | Vickers | 73—344X |
| 2,967,423 | 1/1961 | Rhodes | 73—17 |
| 3,202,602 | 8/1965 | Beaugh | 73—17X |
| 3,360,993 | 1/1968 | MacMillan | 73—361 |
| 3,442,116 | 5/1969 | Brown | 73—17 |

RICHARD C. QUEISSER, Primary Examiner

C. E. SNEE III, Assistant Examiner

U.S. Cl. X.R.

73—53